Figure 4:
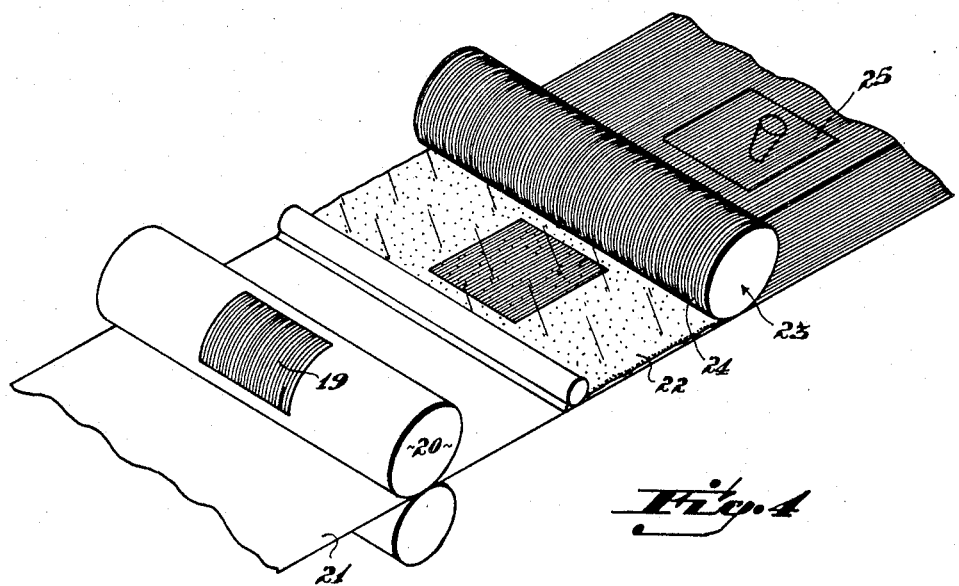

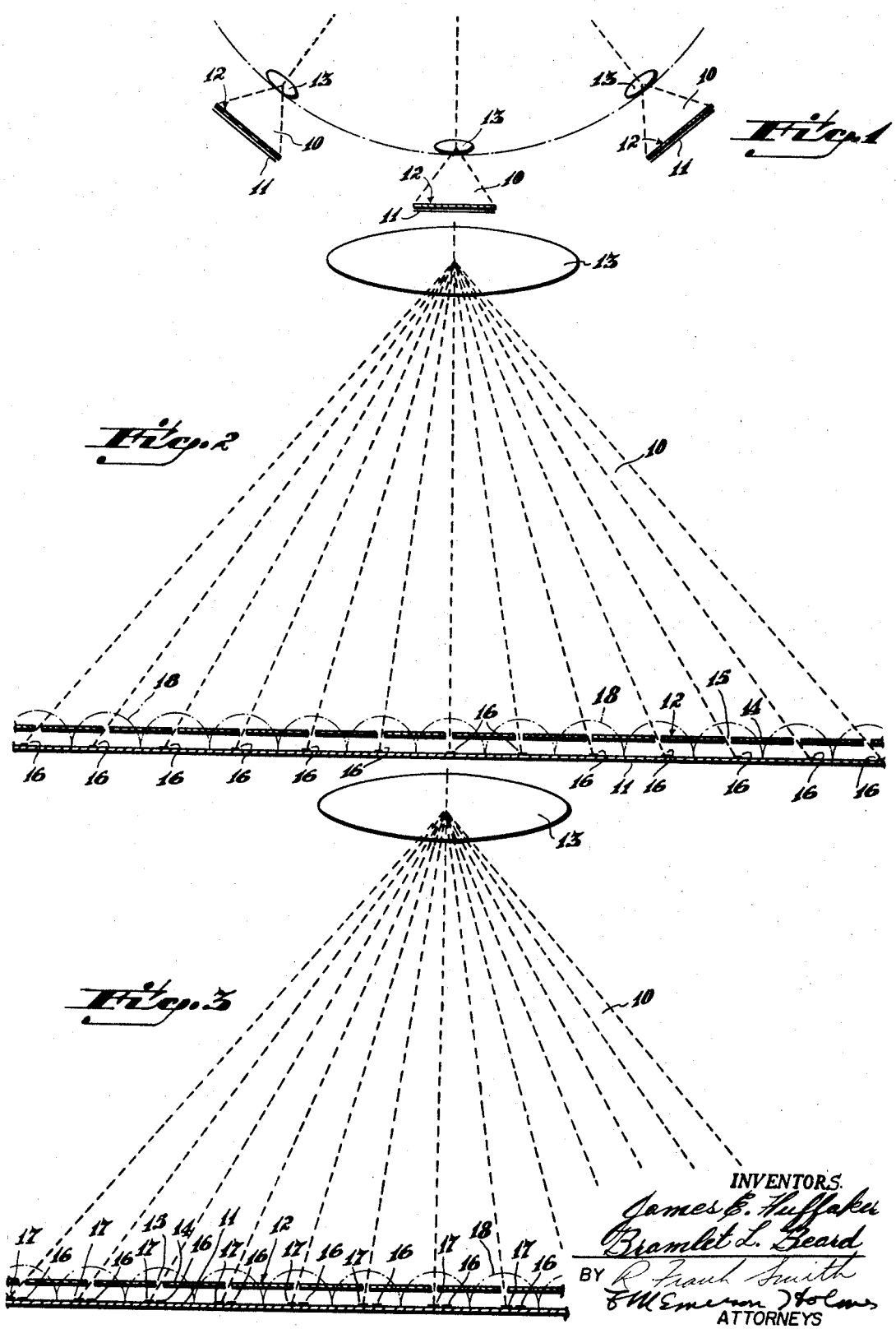

INVENTORS
James E. Huffaker
Bramlet L. Beard
BY
ATTORNEYS 3,420,663
SIZING AND LAYOUT OF AUTOSTEREOGRAPHIC PRINTS FOR GRAPHIC ARTS REPRODUCTION
James Edward Huffaker and Bramlet L. Beard, Kingsport, Tenn., assignors to Eastman Kodak Company, Rochester, N.Y., a corporation of New Jersey
Filed June 21, 1965, Ser. No. 465,491
U.S. Cl. 96—40          8 Claims
Int. Cl. G03c 9/02

This invention relates to the reproduction of "parallax panoramagrams" and more particularly the invention relates to the setting up of printing apparatus by which a lineiform image and viewing azimuth defining means may be properly matched.

By way of background, a parallax panoramagram is a type of stereographic reproduction constituted by a photograph or printed image viewed through a line screen (picket fence) or through a lenticular sheet, the reproduction being obtained through the following series of steps: First, an object is photographed with a special camera from a plurality of angular positions onto a film having a taking screen (line or lenticular) disposed in front of the film. As the camera is moved, the screen is shifted slightly with respect to the film to provide, at each screen position, a series of vertical line images corresponding to the angular position of the camera. When developed, printed and viewed through an equivalent screen, a stereoscopic effect is obtained, the eyes of the viewer corresponding to two angular positions of the camera.

The taking and viewing screens are respectively referred to as the taking and viewing azimuth defining means. The picket fence form of grating, that is, the line screen, may have, for example, one hundred lines per inch, the light transmitting areas constituting approximately ten percent of the area of the screen. Alternatively, the grating may be a lenticular screen, that is, a transparent sheet having a surface embossed with contiguous ribs, each presenting a cylindrical surface and forming a lenticule or lenticular lens.

To make a large number of such autostereo prints, as for example for use in a periodical or a large number of advertising displays, the process employed includes the steps of printing the picture, that is the lineiform image, on paper, coating the paper with a plastic and finally embossing the plastic to mold it in the form of a lenticular screen. The number of lines per inch in the printed lineiform image must exactly correspond to the number of lines per inch in the embossed lenticular screen for otherwise distracting areas of moiré pattern would occur which would ruin the coated print. The criticality of avoiding the mismatch which produces such moiré lines can be understood by the following example.

Suppose, the original was taken using a taking screen of pitch .010 inch (100 lines per inch). The final viewing screen pitch to be embossed on the printed paper is 0.005 inch (200 lines per inch). Obviously, when using a fixed size embossing matrix, usually in the form of a roller, the picture will have to be reduced fifty percent. If instead, the picture were reduced only far enough to cause the pitch to be 195 lines per inch instead of 200 lines per inch, the mismatch would produce five moiré lines per inch. That is, in the final coated and embossed print—in every inch of picture, there would be five areas that are distracting and would ruin the appearance of the print, as well as degrading the stereo effect. If 195 lines per inch constitute a mismatch which gives five lines per inch moiré in the final picture, 199 lines per inch give a one line per inch moiré and 199.9 would give 0.1 lines per inch moiré. A mismatch of 0.1 line per inch is, of course, one line of moiré in ten inches of coated picture.

Even that small mismatch of information to viewing screen exceeds the allowable tolerance for the system. The mismatch should not exceed 1 in 20 inches of picture for complete absence of objectional confusion.

In the above example, (i.e., with 200 lines per inch) a one line mismatch in twenty inches of picture occurs with a viewing system at 0.005 inch between lenses or grid elements and the print at 0.005001 inch between analogous picture elements. Obviously, this difference is one millionth of an inch. Despite the high degree of precision required, we have developed a suitable technique whereby sizing can be accomplished easily, quickly, and without expensive auxiliary apparatus to a process camera.

It has been an objective of the invention to provide a method of sizing, that is a method of matching the pitch of the embossing matrix (which is usually in the form of a roller) to the pitch of the lineiform image printed on the paper.

It is obvious that holding the mismatch to less than one in twenty inches of picture cannot be done satisfactorily merely by viewing the picture through a lenticular screen formed by the embossing roller which will be used in the printing process. The picture normally would not exceed approximately six inches in its maximum dimension and in viewing such a picture the presence or degree of mismatch is difficult to perceive.

One objective of the invention is to eliminate the need to observe directly the mismatch or lack of it of the lineiform image when superposed by the viewing screen. As discussed below, the invention actually introduces a control having a known and easily identifiable mismatch. The embossing roller is compared to this control standard (showing, say, $x$ lines per inch moiré) and then the picture is printed so that when it is compared to the standard it will also show exactly $x$ lines per inch moiré. Stated another way, the picture is viewed through a screen which will cause a mismatch of a known number of lines per inch with a perfectly sized picture. Actually, a projected picture is viewed through such a control screen with the size of the projected picture being varied (by varying the optical magnification) until the predetermined number of moiré lines per inch occur. At this point, the picture is properly sized; special embodiments provide additional correction for minor factors such as shrinking of the printed sheet which may also contribute slightly to the mismatch.

According to the invention, a pattern of lines, herein called a "sizing ruler" is prepared having a pitch slightly greater or slightly less than the pitch of the embossing matrix. For example, with an embossing roller of 200 lines per inch, a sizing ruler is made up with say 199 or 201 (or in two parts, one with 199 and the other with 201) lines per inch.

If the sizing ruler gives X moiré lines per inch when compared with the embossing matrix, a projection printer holding the lineiform negative to be printed is focussed on the ruler and the magnification is changed until the superimposed images show the required X moiré lines per inch. Various ways of being sure that the image differs from the ruler in the same direction as does the matrix, are discussed below. In the preferred form, two rulers of differing pitch can be used adjacent to each other so that the matrix and projected image give the right number of moiré lines with each ruler.

If the printing process introduces a fixed percentage variation from the size of projected image from which it is made, allowance for such change can be made by purposely changing the size of the projected image.

Another objective of the invention has been to provide a process for laying out two or more different lineiform images for printing on the same page to insure that the picture elements in each print are mutually parallel and have identical relationships to the final embossed coating.

This objective is attained in part by exposing the border of the respective negatives through the taking screen at the same camera and screen positions in the traverse of the camera and screen. Assuming that this exposure is made exactly at the center of the traverse, the border around each negative will appear as a grid whose exposed lines are parallel to the linear stereo information and centered on each series of images. In laying out the images preparatory to making a printing plate, the exposed grid lines of the respective negatives are oriented so that they will be centered under the lenticules of the viewing screen, thereby assuring identity of orientation of stereo information between dissimilar negatives.

Figure 5:
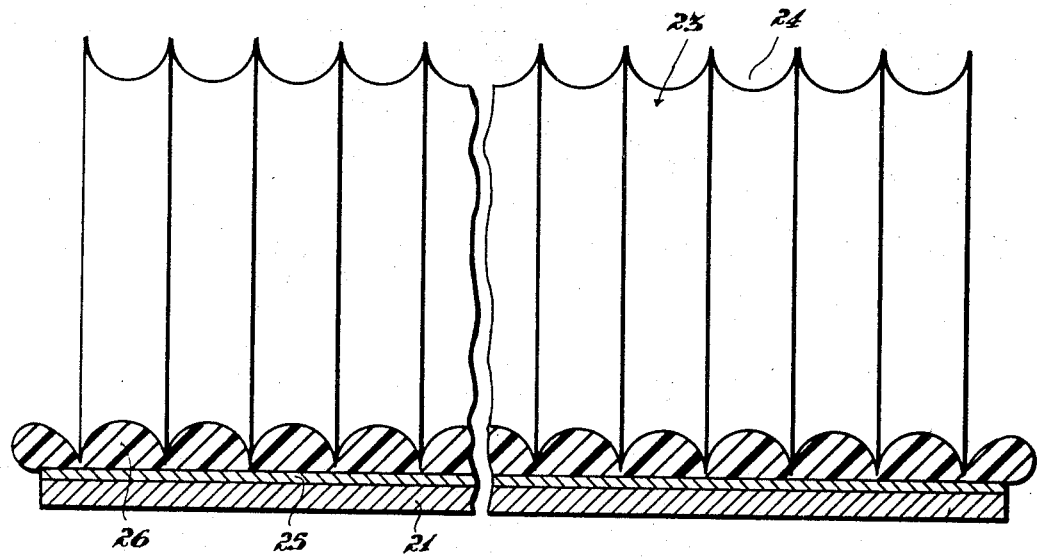
Figure 6:
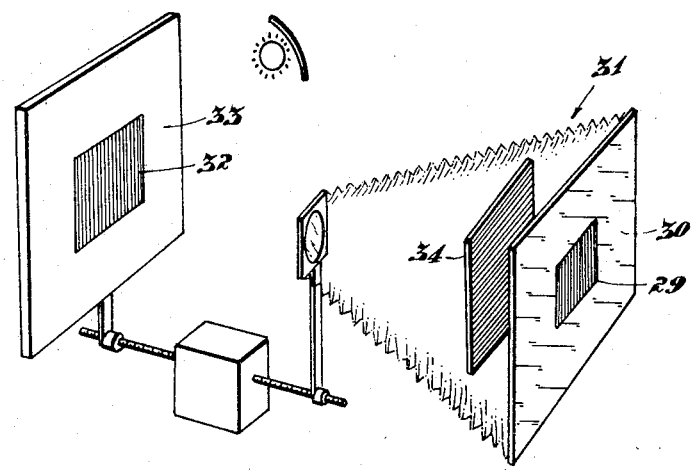
Figure 7:
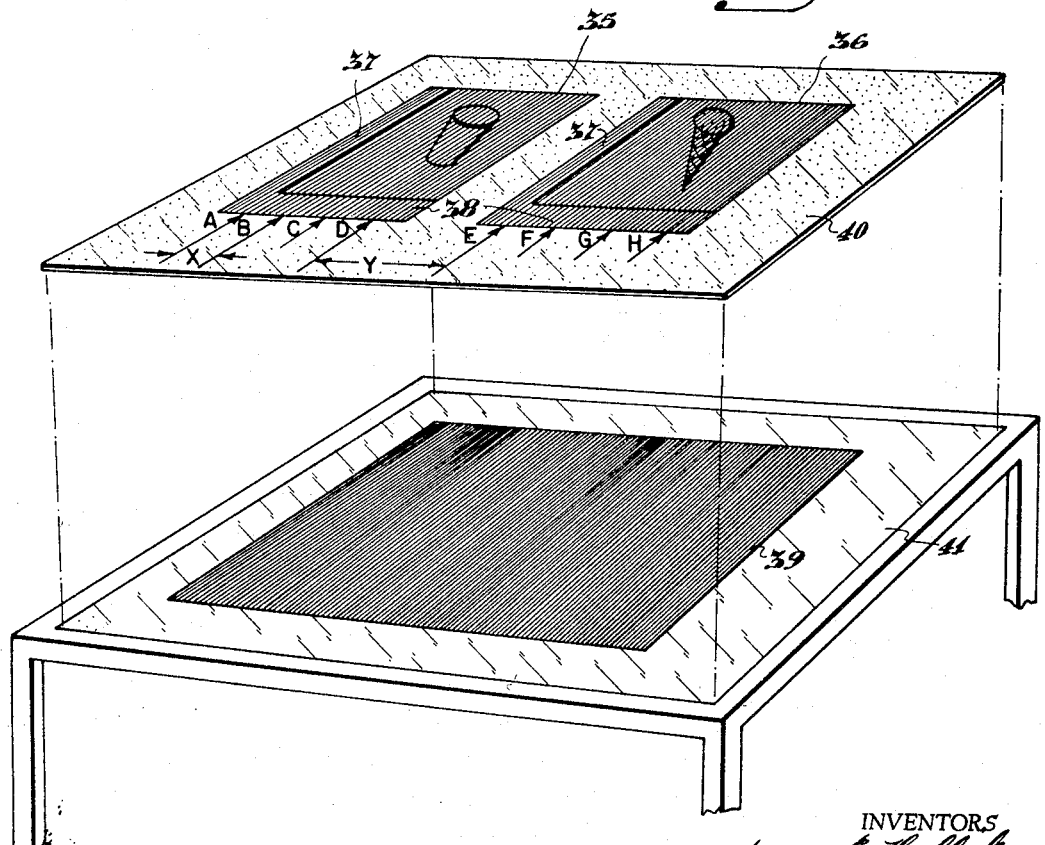

The several objectives of the invention will become more readily apparent from the following detailed description taken in conjunction with the accompanying drawings in which:

FIG. 1 is a diagrammatic view of the manipulation of a camera by which the lineiform image is shot, FIGS. 2 and 3 are diagrammatic views illustrating the relationship of the taking screen in the camera to the film to form the lineiform image, FIG. 4 is a diagrammatic illustration of the printing process by which the autostereographic prints are produced, FIG. 5 is an enlarged cross sectional view illustrating the co-action of the embossing roller with the plastic film to form a lenticular screen over the lineiform image, FIG. 6 is a diagrammatic view of a process camera illustrating the manner in which the pitch of the lineiform image is matched to the pitch of the embossing roller, and FIG. 7 is a diagrammatic view illustrating the process for laying out multiple pictures to be printed on a single sheet.

For the sake of simplicity, the invention will be described in relation to the process for making engraving plates for letter press printing, for it is in this environment that the invention has its greatest application. It will be obvious that the invention is equally applicable to other types of printing such as offset, gravure, intaglio and the like. Further, the invention will be described in the process of making black and white prints but it will also be apparent that the invention is equally applicable to color prints, certain steps merely being repeated in order to match the pitch of the lineiform images in the color separations to the pitch of the embossing roller.

The method by which the original lineiform image is taken is illustrated in FIGS. 1 to 3. This process generally is well known and for more complete details to the process and apparatus employed in practicing the process, reference may be had to Patent No. 1,260,682. As illustrated in FIG. 1, a taking camera 10 is mounted on a support by which it can be revolved about an objective (not shown) the objective being located at the center of the axis of revolution. The taking camera 10 includes means for holding a film 11 and a taking screen 12 spaced from the film 11 and located between the film and the camera lens 13. As illustrated in FIG. 2, the taking screen may be a grating having opaque portions 14 spaced from each other to define line apertures 15. The taking screen may have a pitch of .010 inches, that is, the screen has one hundred of the lined apertures 15 per inch.

In taking the picture, the camera is moved through a portion of a circle about the objective and a continuous exposure is made. As the camera is moving, the screen 12 is shifted with respect to the film. Thus, as illustrated by comparing FIGS. 2 and 3, which represent positions of the camera, in the first position a group of spaced images 16 are received by the film 11, each image corresponding to a slightly different portion of the objective. A second group of images 17 adjacent to the first group of images is received by the film 11 as the camera moves and this process is repeated continuously during the camera movement, thereby exactly filling out the area of the film.

For reasons which will appear, it is advisable to provide a replica of the taking screen on a bottom and side edges of the original negative. That replica is obtained by masking the central portion of the negative from a separate light source in the camera and using the light source to expose the border of the negative through the taking screen. Preferably, the exposure is made when the camera and screen are midway in their traverse so that each exposed line is centered on a series of images. The exposure may be made at any other point in the traverse as long as all negatives are exposed at the same relative position.

When the negative is developed and a positive printed from the negative, that positive when viewed through the naked eye will appear as a meaningless lineiform image. However, if viewed through the taking screen 12, all images except those shot at a particular camera position will be occluded so that only a single series can be seen with each eye. For example, the left eye would see only the series 16 and the right eye would see only the series 17 and since the two series were taken from two different positions, a stereoscopic impression would be received by the brain.

The same stereoscopic effect can be obtained by viewing the lineiform image through a lenticular screen which is diagrammatically illustrated at 18 in FIGS. 2 and 3. That screen is formed by a plurality of semi-cylindrical lenses having the same pitch as the taking screen. It is, of course, preferred to use the transparent lenticular screen for viewing rather than the grating 12 which is approximately 90% opaque.

The manner in which the prints are prepared for final viewing is illustrated in FIGS. 4 and 5. The lineiform image indicated at 19 is applied to a printing cylinder 20 by following certain steps which are well known in the printing art and by introducing certain steps of the present invention which will be described below. The image is printed on a web or sheet 21 which is thereafter coated with a thin film of thermoplastic material 22. In the illustrated embodiment, the plastic is engaged by an embossing roller 23 having circumferential grooves 24 on its surface, the grooves embossing in the plastic a lenticular screen whose lenticules are parallel to the lines of the image 19 and whose pitch is identical to the pitch of the lineiform image 19. Embossing of the plastic film is not always done by a roller as shown. It may be embossed by other matrices such as a plate secured to a cylinder. The thus coated and embossed prints indicated at 25 have the desired autostereo characteristics and appear to be three dimensional when viewed through the lenticular screen 26 formed by the embossing of the plastic.

The steps of the process which have been described above are known and are the subject to such variations as are required for different photographing and printing processes as are known in the art. The present invention is concerned with the matching of the pitch of the lineiform image to the pitch of the embossing roller and is concerned with the layout of two or more autostereographic prints for graphic arts reproduction.

In the following description of the invention, let it be assumed that the original picture was taken through a taking screen of 0.010 inch pitch, but the final viewing screen, as formed by the embossing roller, has a 0.005 inch pitch. The final print must be reduced by 50%, with some allowance being made for process shrinkage. Ultimately, the image which is etched on the engraving plate must have exactly the same pitch as the final viewing screen.

To attain the exact match required, a grid is prepared whose pitch does not match the embossing roller and this grid is printed on paper and finally embossed. Moiré fringes are generated, the number of which is dependent upon the degree of mismatching. For sizing to an embossing roll having a 0.005 inch pitch, a grid, which is called the sizing ruler, is created to yield one moiré fringe per inch, the sizing ruler having a pitch of 199 lines per inch. It should be noted that knowing actual pitch of either the embossing roll or the sizing ruler is unimportant to the technique, but it is essential that the pitch of the sizing ruler be uniform. Thus, if the moiré fringes generated after embossing the ruler's print are uniform, then the embossing roller also has uniform pitch. The ruler can be printed over the entire area which will be embossed to ascertain the presence or absence of areas of uniform pitch on the embossing roller.

In general, it is not critical to the present invention how the ruler is prepared. It may be photographic or printed or ruled on a ruling machine. It may be on metal, glass, plastic or paper. It may be made by molding a sheet from the embossing matrix and by introducing a uniform amount of shrinkage to the sheet. The amount of mismatch is not critical since two different things which have to match each other are compared to the ruler and are correct if both differ from the ruler by the same amount whatever it turns out to be.

When an extremely precise ruler is used, it not only serves the purpose of the present invention in sizing, but also serves to check the embossing matrix itself for aberrations or areas which vary from the true or average number of lines per inch. Care can then be exercised to emboss only with the good areas.

It is also not critical to the invention as to how one checks the mismatch of the ruler and matrix. One direct way is to superimpose a lenticular screen produced by the matrix on the ruler and count the moiré lines—one per inch in the example discussed above. The moiré pattern provides an extremely critical but very convenient control since it is very easy to see when one has exactly one moiré line per inch (within less than a twentieth of an inch) which means that an error of one line in twenty inches can be easily detected.

Referring to FIG. 6, a sizing ruler 29 is placed on a ground glass screen 30 of a process camera 31. A print 32 from the original negative is placed on the copy board 33 of the process camera and its image projected on the ground glass, which is located precisely at the film plane, in such position that the image falls on the sizing ruler 29. Again, moiré fringes are generated if the image and ruler are of dissimilar size. The image size is optically varied until the number of moiré fringes generated at the camera back equals the number generated by the embossed plastic over the print of the sizing ruler. Usually the moiré generated between image and ruler are easily discernible, but a replica of the taking screen included on the bottom and side edges on the original negative yields very easily discernible moiré. Alternatively, a single test exposure made at the same time the original picture was made and processed simultaneously with the original can be used in the copy board for sizing rather than the original.

It should be noted that it is possible to obtain the same moiré count whether the picture is larger or smaller than the sizing ruler. In practice then, not only must the counts be the same but the pitch of the ruler must be larger than the pitch of the picture since the pitch of the ruler was generated larger than that of the embossing roller. Alternately, two sizing rulers can be used, both of which yield easily countable moiré, but one is made with a pitch slightly larger than the roller; the other is made slightly smaller. Therefore, there is only one camera position which will give the correct number of moiré fringes on both rulers simultaneously. The alternate scheme obviously eliminates possible wasted shots due to obtaining the correct number of moirés but being on the wrong side of correct size.

Usually, it is necessary to compensate for process shrinkage in making half-tone positives and negatives. This can be easily done by use of the sizing ruler to indicate the amount of shrinkage that occurs. Thus, if before processing the image and ruler created ten moiré fringes across the length of the ruler but showed 11 moiré fringes after processing, the new film had shrunk the equivalent to one moiré. Thus, to maintain size and compensate for processing shrinkage, the image and ruler should create only 9 moiré fringes before processing.

Once the desired image size is set on the ground glass 30, film is positioned in the process camera and exposed through a half-tone screen 34 which may be of the type disclosed in copending application of Howe et al., Ser. No. 189,748, now U.S. Patent No. 3,161,509.

The screened negative is then taken through steps well known in the graphic arts to produce the printed lineiform image 19 referred to in the description of FIG. 4.

In addition to sizing a lineiform image to the pitch of the lenticular screen through which it will be viewed, the present invention is concerned in part with the laying out of two or more sized negatives for printing on the same sheet, and more particularly, the object of the invention has been to provide a process by which it can be assured that the several pictures will have identical relationships to the final viewing screen, that is, the embossing coating. The objective of the invention is attained again by viewing the negatives through a screen designed to provide a controlled mismatch and spacing the negatives with respect to each other to provide an uninterrupted moiré fringe frequency, that is to say, a uniform spacing of the moiré patterns across the printing plate.

In FIG. 7, two lineiform negatives 35 and 36 are shown and it is desired to position the negatives properly with respect to each other preparatory to making a printing plate, for example, an engraving plate. The negatives have preferably been individually matched to the pitch of the final viewing screen and as indicated earlier, a replica of the taking screen having been generated along one vertical edge at 37 and across the bottom of the negative at 38, thereby generating an L-shaped grid. The bottom grid 38 is used first for sizing in the manner described above and then layout. The side grid 37 is used to determine parallelism.

A very large grid 39, the size of the printing plate, is created which is dissimilar in size to the grids located on the sized negatives so that when the two are in contact, moiré will be generated along the bottom edges of the pictures. The large grid is covered with a plastic sheet 40 and laid over a light table 41. The sized negatives are then taped, or otherwise secured to the plastic in place as indicated by the moiré generated. The moiré generated at the side of the negative must be mutually parallel. The moiré at the bottom is used to obtain the correct side to side relationship. Assume that fringes occur at A, B, C and D in negative 35 and at E, F, G and H in negative 36, the distance between fringes being uniform and equal to $x$. The negatives must be shifted until the distance $y$ between fringes of the adjacent negatives must be an integral multiple of $x$. Thus, identical picture information in adjacent pictures will occur in an integral number of viewing systems away. Stated another way, when viewing an autostereographic print and moving horizontally with respect to the print, a phenomenon of inversion or snapback (the eye shifting to adjacent images) regularly occurs as the viewer moves laterally with respect to the print. By practicing the process of the invention, the snapback on all pictures on the same page occurs at an identical moment as the head of the viewer is moved.

The layout process described above may be modified slightly by substituting for the grid 39 a lenticular viewing screen or a screen grating whose pitch matches that of the negatives 35 and 36. The substituted screen is placed over the negatives and the border grids 37 and 38 are viewed through it. The negatives are shifted with respect to each other until parallelism of the side borders 37 is determined and until the stereo information is centered under the lenticules of the viewing screen. The latter alignment is determined by the appearance of the exposed bottom borders 38 through the screen. If the exposure by which the border grid is made occurred during the center of the traverse, then the black exposed lines will appear as solid black when centered under the lenticules of the screen and when viewed perpendicularly to the plane of the screen. If a screen grating is used instead of a lenticular screen and if the grating lines contact the emulsion side of the negatives, perpendicular viewing will not be required. Rather, it will be necessary to shift the negatives until solid black appears at the location of the border grid 37, 38.

After the negatives are properly positioned, the plastic sheet to which the pictures are fixed is transferred to a printing plate and the printing plate is processed in a known manner preparatory to printing and embossing as described generally in connection with FIG. 4.

We claim:

1. The method of matching a lineiform image to a lenticular screen prepared from an embossing matrix comprising the steps of
   (a) projecting the lineiform image at least partially onto the plane of a sizing ruler having a known pitch mismatch with said lenticular screen,
   (b) varying the magnification of said lineiform image until a moiré fringe frequency corresponding to said known pitch mismatch occurs, and
   (c) preparing a printing plate of the lineiform image having a corresponding magnification to that of the lineiform image whose moiré fringe frequency corresponds to said known pitch mismatch.

2. The method of matching a lineiform image to a final lenticular viewing screen,
   (a) projecting the lineiform image onto the plane of a sizing ruler having a pitch differing slightly from the pitch of the final lenticular viewing screen,
   (b) varying the size of said lineiform image until a number of moiré fringes appear which correspond to the difference in pitch between said sizing ruler and final lenticular viewing screen, and
   (c) preparing a printing plate of an image whose size is equal to the size of the image in the plane of said sizing ruler.

3. The method of matching a lineiform image to a final lenticular viewing screen prepared from an embossing matrix comprising the steps of,
   (a) projecting the lineiform image onto the plane of a sizing ruler having a known pitch mismatch with said lenticular viewing screen,
   (b) varying the size of said lineiform image until moiré fringes corresponding to said known mismatch occurs,
   (c) further varying the size of said lineiform image to compensate for material shrinkages that may occur during processing, and
   (d) preparing a printing plate of the image and of a size that is equal to that appearing in the plane of said sizing ruler.

4. The method of matching a lineiform image to a lenticular screen having $x$ lenticules per inch and comprising the steps of,
   (a) projecting said lineiform image onto a sizing ruler having $x-y$ lines per inch where $y+x$, the projection of said lineiform image being such that the image lines are parallel to the lines of said sizing ruler, and
   (b) varying the size of the lineiform image until $y$ moiré fringes per inch are created between said lineiform image and said sizing ruler.

5. The method of laying out at least two lineiform images for reproduction on a single printing plate, said lineiform images having been created on film using a camera employing taking screens of equal pitch which screens have also been photographically reproduced on said film to form a lineiform right angular border around said lineiform image, said method comprising the steps of,
   (a) mounting a viewing screen adjacent said images, said viewing screen having a pitch differing from those on said right angular borders thereby creating equally spaced moiré fringes on said right angular borders,
   (b) adjusting said images until said fringes on the right angular border of one image are parallel to the fringes on the right angular border of an adjacent image, and
   (c) varying the lateral spacing between said images until the distance between any fringe on the border of said adjacent image is an integral multiple of the space between adjacent fringes on the right angular border of one of said images.

6. The method of laying out at least two lineiform images for reproduction on a single printing plate comprising the steps of,
   (a) mounting a viewing screen adjacent said images, said viewing screen having a pitch differing from that of said images thereby creating equally spaced moiré fringes on said images,
   (b) adjusting said images until said fringes of one image are parallel to the fringes of an adjacent image, and
   (c) varying the lateral spacing between images until the distance between any fringe on one image and any fringe on said adjacent image is an integral multiple of the space between adjacent fringes on either of said images.

7. The method of laying out at least two lineiform images for reproduction on a single printing plate comprising the steps of,
   (a) mounting a viewing screen adjacent said images, said viewing screen having a pitch differing from that of said images thereby creating equally spaced moiré fringes on said images, and
   (b) varying the lateral spacing between images until the distance between any fringe on one image and any fringe on an adjacent image is an integral multiple of the space between adjacent fringes on either of said images.

8. The method of matching a lineiform image to a lenticular screen having $x$ lenticules per inch and comprising the steps of:
   (a) projecting said lineiform image onto sizing rulers containing $x+y$ and $x-y$ lines per inch where $y<x$, the projection being such that the lines of said lineiform image parallel the lines on said sizing rules,
   (b) varying the size of said lineiform image until $y$ moiré fringes per inch are created between said image and each of the sizing rulers, and
   (c) making a printing plate of said lineiform image the size of which created $y$ moiré fringes with said sizing rulers.

References Cited

UNITED STATES PATENTS

| | | | |
|---|---|---|---|
| 1,260,682 | 3/1918 | Kanolt | 88—24 X |
| 2,689,502 | 9/1954 | Ayres | 88—24 |
| 3,028,785 | 4/1962 | Leach | 88—24 |

OTHER REFERENCES

Theocaris: Applied Mechanics Reviews, "Moiré Fringes, A Power Measuring Device," May 1962, pp. 333–337.

NORMAN G. TORCHIN, *Primary Examiner.*

R. E. MARTIN, *Assistant Examiner.*

U.S. Cl. X.R.

350—131